United States Patent [19]

Keeling et al.

[11] Patent Number: 5,116,255
[45] Date of Patent: May 26, 1992

[54] ANIMAL CAGE

[76] Inventors: Michale E. Keeling, 103 Wedgewood, Elgin, Tex. 78621; William E. Britz, Jr.; David W. Clark, both of P.O. Box 1151, Bryan, Tex. 77806

[21] Appl. No.: 257,091

[22] Filed: Oct. 13, 1988

[51] Int. Cl.5 .................... A01K 1/00; A01K 15/02
[52] U.S. Cl. .................... 119/18; 119/17; 119/29
[58] Field of Search .............. 119/15, 17, 18, 29, 119/23

[56] References Cited

U.S. PATENT DOCUMENTS

| | | |
|---|---|---|
| 1,373,350 | 3/1921 | Ray . |
| 1,676,015 | 7/1928 | Feick . |
| 1,814,979 | 7/1931 | Taylor .................... 119/17 |
| 1,916,878 | 7/1933 | Anklam .................... 119/23 |
| 2,086,631 | 7/1937 | Munro .................... 119/29 |
| 2,640,460 | 6/1953 | Siegel .................... 119/29 |
| 2,681,040 | 6/1954 | Kniesteadt .................... 119/15 |
| 2,681,638 | 6/1954 | Carvell .................... 119/29 |
| 2,684,051 | 7/1954 | Leblond et al. .................... 119/17 |
| 3,334,915 | 8/1967 | Sulyma et al. .................... 280/206 |
| 3,367,308 | 2/1968 | Quattrone et al. .................... 119/15 |
| 3,496,913 | 2/1970 | Vail .................... 119/23 |
| 3,662,712 | 5/1972 | Singer .................... 119/17 |
| 3,682,477 | 8/1972 | Harkins .................... 280/208 |
| 3,769,929 | 11/1973 | Scheber .................... 280/206 |
| 3,774,576 | 11/1973 | Moore .................... 119/23 |
| 3,776,195 | 12/1973 | Willinger .................... 119/18 |
| 3,785,347 | 1/1974 | Dinnerstein .................... 119/29 |
| 3,818,868 | 6/1974 | Boehland, Jr. .................... 119/23 |
| 3,933,126 | 1/1976 | Gordon .................... 119/29 |
| 3,994,262 | 11/1976 | Suchowski .................... 119/29 |
| 4,022,159 | 5/1977 | Salvia . |
| 4,064,839 | 12/1977 | Rodemeyer .................... 119/15 |
| 4,088,094 | 5/1978 | Howard .................... 119/29 |
| 4,250,833 | 2/1981 | Waldon .................... 119/15 |
| 4,284,034 | 8/1981 | Belew .................... 119/18 |
| 4,334,498 | 6/1982 | Bedding .................... 119/15 |
| 4,579,336 | 4/1986 | Morin .................... 272/115 |

FOREIGN PATENT DOCUMENTS

| | | |
|---|---|---|
| 2829301 | 1/1980 | Fed. Rep. of Germany . |
| 709236 | 8/1931 | France . |
| 1344946 | 12/1963 | France . |
| 2087253 | 12/1971 | France . |

OTHER PUBLICATIONS

ZooNooz, Zoological Society of San Diego, Inc., vol. LXI, No. 12, (Dec. 1988) pp. 6–8.
International Search Report.

Primary Examiner—Paul J. Hirsch
Attorney, Agent, or Firm—Arnold, White & Durkee

[57] ABSTRACT

An animal cage comprising an enclosure having a shape capable of rolling movement. The enclosure has openings therein, preferably formed of mesh, for passage of gases and matter therethrough and to prevent egress of the animal. The enclosure further includes a door for passage of the animal and may include a food reservoir and fluid reservoir to provide food and fluid to an animal housed within the cage. A second enclosure may also be provided within the first enclosure to prevent injury of the animal due to movement of the cage. The enclosures may be formed on a support frame having one or more longitudinal rings or half-rings and one or more latitudinal rings or half-rings. The enclosures may be completed by individual section members which cover sections of the enclosure and which are held in place by outer tension bars and inner compression bars. The outer tension bars and inner compression bars are held in relative tension and compression by a polar cap assembly having a tension cone and a compression cone for acting on the tension and compression bars.

20 Claims, 10 Drawing Sheets

ANIMAL CAGE

BACKGROUND OF THE INVENTION

1. Field of the Invention

The present invention relates generally to animal cages. More particularly, the present invention provides an animal cage having a shape capable of rolling movement such that an animal housed within the cage may rotate the cage for movement.

2. Description of the Relevant Art

Animal cages as known in the art generally include cubical shapes of varying sizes and varying construction. Cages are often mounted in mobile or fixed racks, or are suspended in rows along room walls. Animals housed within such cages are unable to move the cage on their own initiative and therefore can change position only within the confines of the cage. The interaction of the animal with its environment is thus restricted as is its ability to interact with other animals.

Much effort has been expended in attempts to develop ways to improve the comfort of the animal or to provide stimuli for the animal in captivity. Standards have been published providing minimum floor area and cage height based upon the weight of the animal or the body length. These standards are generally the minimum required and are considered by many to be insufficient for animal well-being. Recently, new federal legislation has been proposed to improve the standards for housing research animals. Such standards are an attempt to improve the psychological well-being and physiological well-being of caged animals.

Whenever a new animal is added to an existing group of animals, it is often desirable that the newcomer be introduced and socialized with the group prior to unrestricted involvement with the group. Oftentimes when an animal is added to a group without prior socialization, it may be injured by attacks from members of the group. It is thus desirable for the safety of new animals to allow interaction and socialization by the new animal to allow assimilation into an existing group. Prior attempts to resolve this problem have been largely unsuccessful because placement of an animal in an immovable cage does not readily allow for social interaction by the new animal with members of the group.

When of necessity or for research reasons, animals must be individually caged, it is desirable that the animal be allowed as much socialization with other animals and interaction with its environment as possible. While the animals may not be able to be housed together, much psychological benefit is derived from close approximation and socialization with other animals. Such other animals may include animals of its own kind or other animals, including humans. With previously known cages, such interaction is minimally effective because the animal is not free to move toward and away from other animals and must remain where its cage is located.

In the particular case of primates used in research, attention has been focused by the public and the scientific community on the treatment and housing of these animals. Given the biological proximity of primates to humans and the limited numbers of certain species, the psychological and physiological health of these animals is of great concern.

There is thus a need for an animal cage which addresses the psychological and physiological well-being of the animal by allowing it to move the cage for socialization and exercise. There is a need for such an animal cage which provides effective protection and housing for the animal and which allows the animal to gain the benefits of social and environmental stimulation.

SUMMARY OF THE INVENTION

The present invention provides an animal cage which may be manipulated by the animal in the cage for movement to allow interaction of the animal with its environment and other animals and to allow the animal to exercise by movement of the cage. Moreover, the invention provides an animal cage in which the animal has some control over its environment. The animal cage provides an effective housing for the animal while allowing maximum interaction by the animal with its environment.

An animal cage in accordance with the present invention is an enclosure having a shape capable of rolling movement. The shape of the enclosure may, for example, be spherical to allow omnidirectional movement, or cylindrical for linear movement. The enclosure has openings which allow the passage of gases and matter therethrough, but prevent egress of the animal from the cage. A door is provided in the enclosure for passage of the animal in and out of the cage.

In one embodiment, an animal cage of the present invention includes a first enclosure of shape capable of rolling movement and a second enclosure disposed within the first enclosure. The first and second enclosures have openings which allow the passage of gases and matter therethrough and the second enclosure has openings which further prevent egress of the animal. In its preferred form, the first and second enclosures are of similar shape and the second enclosure is concentrically located within the first. Preferably, the first and second enclosures are spherical for omnidirectional movement. The animal cage further includes a first door in the first enclosure and a second door in the second enclosure to allow placement or removal of the animal in the second enclosure.

To prevent possible injury to the animal, the difference in the size of the first and second enclosures preferably prevents extension of an appendage of the animal outside the first enclosure. In one such embodiment, the openings in the second enclosure prevent extension of an appendage of the animal in the cage outside the second enclosure. In yet another embodiment, the openings in the second enclosure prevent extension of an appendage outside the second enclosure and the radius of the first enclosure is greater than the radius of the second enclosure by at least the length of the longest digit of the animal. This configuration prevents injury to the fingers and toes of the animal due to movement of the cage.

In a preferred form, an animal cage in accordance with the invention includes a support frame of shape capable of rolling movement and includes a first enclosure located on the outer side of the support frame and a second enclosure located on the inner side of the support frame, the first and second enclosures having openings for passage of gases and matter therethrough, and the second enclosure having openings which further prevent egress of the animal. Preferably, the support frame and the first and second enclosures are spherical to allow omnidirectional movement of the cage by the animal.

The animal cage may further include a first door in the first enclosure and a second door in the second enclosure to allow ingress or egress of the animal into the second enclosure. The first and second doors are preferably aligned for ease of operation. The dimensions of the first and second enclosures and the space therebetween may be adjusted as discussed above to prevent injury to appendages or digits of the animal.

The support frame may include one or more latitudinal rings and one or more longitudinal rings, the latitudinal and longitudinal rings joining to form the support frame. The latitudinal rings and the longitudinal rings may interlock at each intersection to form the frame. For ease of construction and operation, the outer enclosure and the inner enclosure may be composed of individual section members, each covering a portion of the support frame bounded by the intersection of a latitudinal ring and a longitudinal ring. In preferred form, the support frame comprises two latitudinal rings and three longitudinal half-rings, and the inner enclosure and the outer enclosure are each formed of six polar section members and three equatorial section members.

The animal cage may include one or more curved inner compression bars and one or more curved outer tension bars, such that compression forces on the inner compression bars compresses the section members of the inner enclosure against the inner side of the support frame, and such that tension forces in the outer tension bars tension the section members of the outer enclosure against the outer side of the support frame. Tension and Compression of the tension bars and compression bars may be achieved through use of a compression cone and a tension cone located at the polar ends of the support frame. The support frame is spaced at the polar ends thereof and the compression cone and tension cone are in contact with the inner compression bars and the outer tension bars such that outward movement of the compression cone compresses the inner compression bars and inward movement of the tension cone tensions the outer tension bars.

Each of the embodiments of the present invention may further include a fluid reservoir located on the enclosure or between the outer and inner enclosures for dispensing fluid to the animal. The fluid reservoir may comprise a collapsible bladder having a valve of conventional design for releasing fluid to the animal. Means may be provided for exerting pressure against the bladder to maintain a pressure in the bladder of greater than atmospheric. The bladder pressure means may include a spring-activated wall located on the enclosure.

An animal cage of the present invention may further include a food reservoir located on the enclosure or between the inner and outer enclosures for dispensing food to the animal. The food reservoir may include an expandable opening for access by the animal to the food. The expandable opening may comprise a pressure pad having a hole with radial slots therethrough, the hole and radial slots preventing spillage of food in a free state but allowing removal of food by the animal through expansion of the opening.

The enclosures may be formed of a variety of suitable materials. Preferably, the enclosures are formed of mesh. For purposes of strength, cleansing, and longevity the mesh may be formed of stainless steel.

DESCRIPTION OF THE PREFERRED EMBODIMENTS

Figure 1:
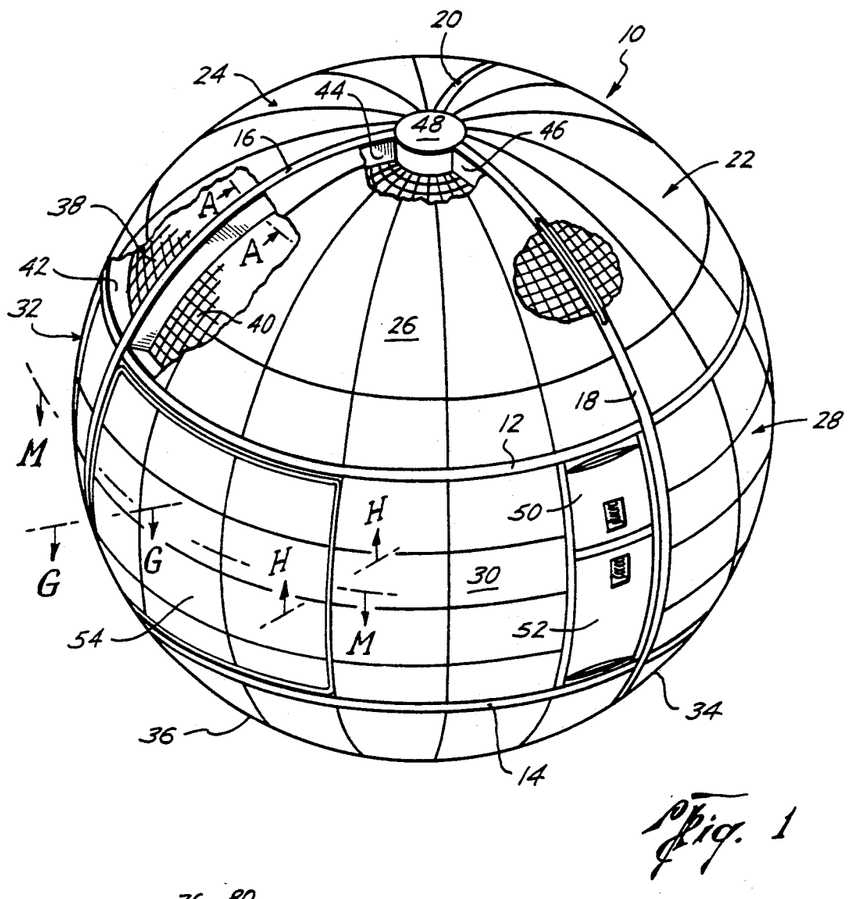
FIG. 1 is a perspective view of an animal cage of the present invention in partial section.

FIG. 1 illustrates an animal cage 10 in accordance with the present invention. The animal cage 10 is an enclosure of shape capable of rolling movement. The enclosure has openings therein for passage of gases and matter therethrough and for preventing egress of the animal. A door 54 is provided in the enclosure for passage of the animal into and out of the animal cage 10.

The animal cage 10 is constructed such that a curvature of consistent radial dimension is maintained so that rolling movement of the enclosure can be attained with very little force. In application, this force will be provided by the mass of the contained animal being moved slightly off of the vertical center line of the circular plane which is parallel with the ensuing direction of travel of the enclosure.

A variety of shapes may be employed for an animal cage in accordance with the invention which are capable of rolling movement. Such shapes include cylinders, cones, and spheres. A spherical shape of the animal cage is preferable to allow omnidirectional movement of the cage by the animal. However, it may be desirable to limit the directions of travel or relative movement of the animal cage such that other shapes capable of rolling movement, such as cylinders, cones, or variations thereof, may be employed. As can be appreciated, a cylindrical shape allows movement primarily in a linear direction, whereas a conical shape may allow only relative circular movement.

The animal cage 10 may include a food reservoir 50 and a fluid reservoir 52 to provide food and fluid to the caged animal. The food and fluid reservoirs will be more fully discussed below.

The animal cage 10 is preferably of open construction to allow visibility into and out of the enclosure. Openness may be achieved by constructing the enclosure of a mesh construction so that openings are present throughout the surface of the enclosure. Mesh may be formed of a variety of suitable materials, such as plastic or metal. Preferably, the mesh is formed of stainless steel, as stainless steel is of suitable durability for an animal cage and may be exposed to animal caging conditions without damage. It is further desirable that the animal cage be capable of withstanding animal excrement and cleansing by cage washers and the like.

The size of the mesh and mesh opening used for construction of an animal cage in accordance with the present invention is a function of the animal's appendage size and of the animal's strength. Preferably, the mesh openings are small enough to prevent extension of an appendage of the animal beyond the cage and are strong enough to withstand the strength of the animal and the movement of the cage. The open construction of the animal cage allows passage of gases and matter into and out of the cage such that urine and fecal matter from the contained animal may exit the enclosure. An open construction further allows the animal cage to be cleaned by conventional spray-washing devices.

The animal cage 10 preferably includes a second enclosure disposed within the first enclosure. The inner enclosure comprises the enclosure in which the animal is contained. The outer enclosure provides protection and isolation of the animal from the surrounding environment.

As discussed above, the first enclosure is of a shape capable of rolling movement and has openings therein for passage of gases and matter therethrough. The second enclosure is preferably of a similar shape to the first enclosure. However, under certain circumstances, it may be desirable that the second enclosure be of a different shape. For example, if the second enclosure is of a cubical shape, the animal may still be able to achieve rolling movement of the first enclosure. The second enclosure has openings therein for passage of gases and matter therethrough but which prevent egress of the animal from the second enclosure.

The shape of the first and second enclosures is preferably spherical to allow omnidirectional movement of the cage by the animal. Preferably, the second enclosure is concentrically located within the first enclosure.

Doors may be provided in the first and second enclosure to allow for passage of the animal. Preferably, the doors are maintained in alignment such that simultaneous opening of the doors allows for placement or removal of the animal into the second enclosure. The doors should be of a construction which does not interfere with the rolling movement of the enclosure. For example, the doors may be slidably operated to minimize any disturbance of rolling movement of the enclosure.

The outer enclosure of the animal cage 10 shown in FIG. 1 is formed of polar section members 22, 24, and 26; equatorial section members 28, 30, and 32; and polar section members 34 and 36, including a further polar section member not visible in the presentation of FIG. 1. The inner enclosure of the animal cage 10 in FIG. 1 is similarly formed of section members, two of which, polar sections 38 and 40, are visible in FIG. 1.

To prevent injury of the animal and to allow proper containment of the animal, the difference in the size of the first and second spherical enclosures prevents extension of an appendage of the animal in the cage outside the first enclosure. Preferably, the openings in the second enclosure prevent extension of an appendage of the animal in the cage outside the second enclosure. Although the openings in the second enclosure may permit the extension of a digit of the animal beyond the second enclosure, the size of the first enclosure is preferably greater than the size of the second enclosure by at least the length of the longest digit of the animal. The animal is thus protected from injury since the animal is unable to extend a digit beyond the protection of the outer enclosure.

As previously mentioned, the animal cage 10 shown in FIG. 1 includes a fluid reservoir 52 and a food reservoir 50 for dispensing food and fluid to an animal within the cage. Preferably, the food reservoir 50 and the fluid reservoir 52 are disposed between the inner and outer enclosures to thereby protect the reservoirs from damage and to allow maximum space to the animal within the enclosure.

As shown in FIG. 1, the animal cage 10 includes a support frame of shape capable of rolling movement. The support frame may take a variety of shapes capable of rolling movement but is preferably spherical to allow omnidirectional movement of the cage. The support frame of the animal cage 10 is formed of one or more latitudinal rings and one or more longitudinal half-rings, the latitudinal and longitudinal half-rings joining to form the support frame. As shown in FIG. 1, the support frame for the animal cage 10 is composed of latitudinal rings 12 and 14 and longitudinal half-rings 16, 18, and 20.

The latitudinal rings and the longitudinal half-rings join to form the support frame. Preferably, the latitudinal rings and the longitudinal half-rings interlock at each intersection and are spaced at the polar ends thereof to allow use of a polar cap assembly at each polar end thereof. A polar cap assembly 48 is depicted in FIG. 1 and will be discussed in greater detail below.

A wide variety of combinations of latitudinal rings, equatorial rings, longitudinal rings, or respective half-rings may be employed to form the support frame. The selection of the requisite member will depend on the necessary strength of the support frame in relation to the size and strength of the contained animal. In addition, the overall weight of the animal cage should not exceed that which is capable of rotational movement by the animal. However, it may be desired that the animal cage be capable of movement only by outside assistance. In such case, the overall weight of the structure with respect to the contained animal is less significant. It may, for example, be desired that the animal be incapable of moving the cage unassisted but that a caregiver may readily move the cage alone by applying pressure to cause rolling movement of the enclosure.

As further shown in FIG. 1, the door 54 and the food and fluid reservoirs 50 and 52 are located within a single equatorial section member Such configuration may allow for ease of construction and manufacture of an animal cage in accordance with the present invention.

As discussed above, injury to the animal may be prevented by preventing extension of a digit of the animal beyond the first enclosure This may be accomplished by dimensioning the radii of the spherical enclosures. Preferably, this is achieved by maintaining the width of the longitudinal rings or half-rings and the width of the latitudinal rings or half-rings at least greater than the longest digit of the animal Reference numerals 42, 44, and 46 in FIG. 1 correspond to the width of the latitudinal ring 12 and the longitudinal half-rings 16 and 18, respectively.

Figure 2:
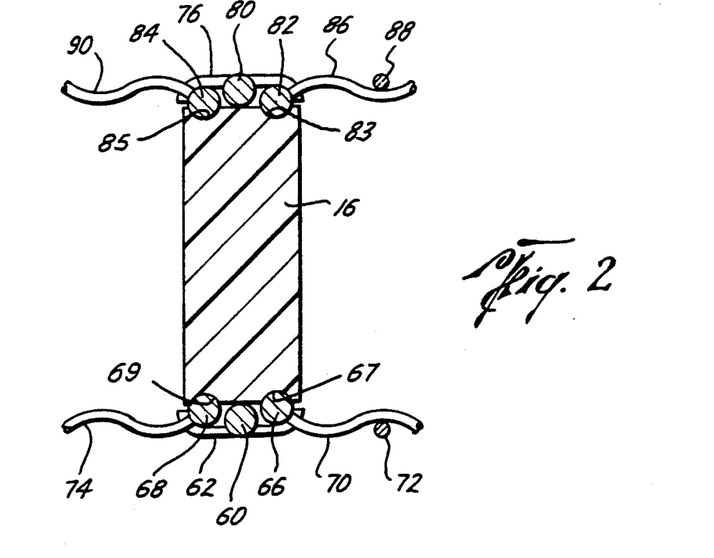
FIG. 2 is a sectional view of the animal cage of FIG. 1, taken along line A—A of FIG. 1.

FIG. 2 is a sectional view along line A—A of FIG. 1 of the longitudinal half-ring 16. Longitudinal ring 16 forms a portion of the support frame for the inner and outer enclosures. On its inner and outer edge, the latitudinal ring 16 contains grooves for receiving the frame members of the individual section members which form the enclosures. In the orientation shown, frame members 82 and 84 form a portion of the frame for an outer polar section member. The frame members 82 and 84 are received in grooves 83 and 85 of the longitudinal half-ring 16. Similarly, frame members 66 and 68 form a portion of the frame of inner polar section members and are received in grooves 67 and 69 as shown.

The section members formed in part by frame members 82, 84, 66, and 68 include mesh wires 70, 72, 74, 86, 88, and 90, as shown. The frame members 82, 84, 66, and 68, and thus the respective section members, are located against the longitudinal half-ring 16 by use of outer tension bar 80 and inner compression bar 60. The outer tension bar 80 includes retaining bar 76, and the inner compression bar 60 includes retaining bar 62. As will be more fully discussed below, the outer tension bar 80 is tensioned against longitudinal half-ring 16 to hold the outer section members onto the support frame. The inner compression bar 60 compresses against the inner side of the longitudinal half-ring 16 to hold the inner section members in place. The retaining bars 76 and 62 maintain the positioning of the section members and will be further discussed below.

Figure 3:
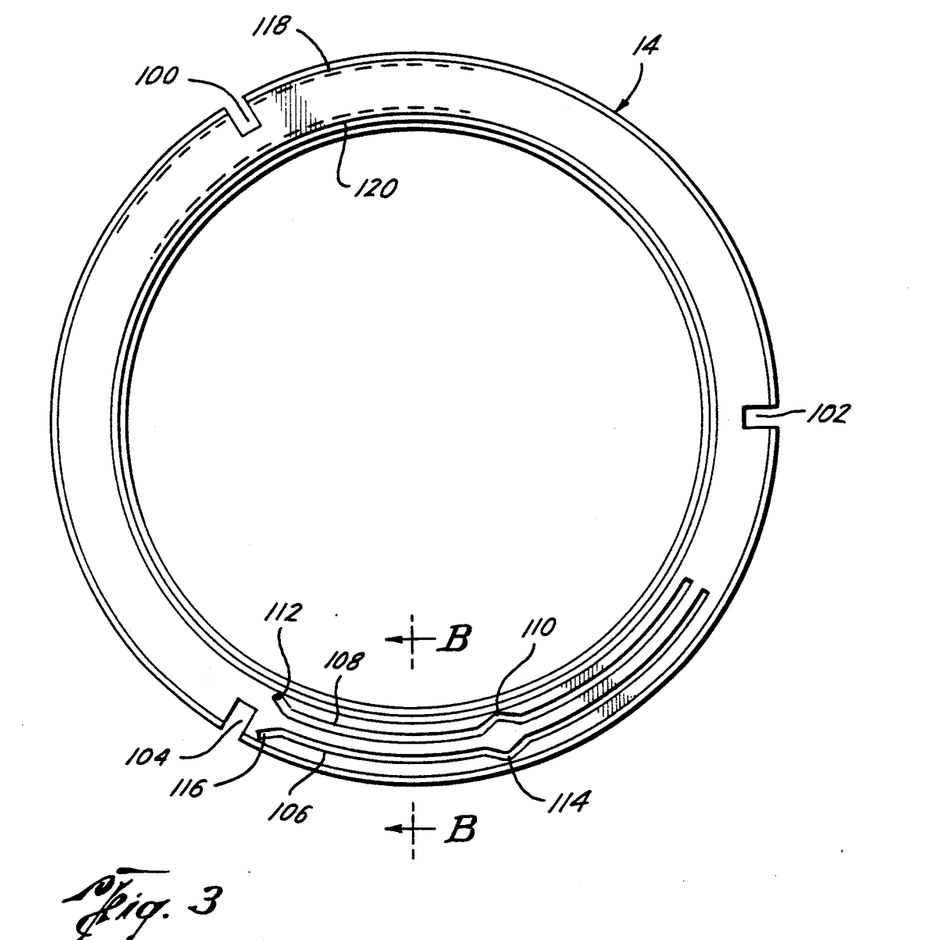
FIG. 3 is a top view of a latitudinal ring of an animal cage of the present invention.

FIG. 3 is a top view of the latitudinal ring 14 which forms a portion of the support frame for the animal cage 10 of FIG. 1. The latitudinal ring 14 includes grooves 118 and 120 for receiving the frame members of the section members in the manner described above. Interlock gaps 100, 102, and 104 are provided, which allow the latitudinal ring 14 to interlock with the longitudinal rings or the longitudinal half-rings. Also shown on the latitudinal ring 14 are door track grooves 106 and 108.

As will be more fully described below, the door track grooves 106 and 108 provide a guide track for the inner and outer doors of the enclosures. The door track 106 includes door track offset 116 and 114. The door track offsets assist in allowing the outer door to slide inside the fixed equatorial section member when the door is opened. When the door is closed, the door track offsets maintain the outer door flush with the fixed equatorial section members so that smooth rolling movement of the enclosure may be accomplished. Similarly, the inner door track 108 includes door track offsets 110 and 112.

Figure 4:
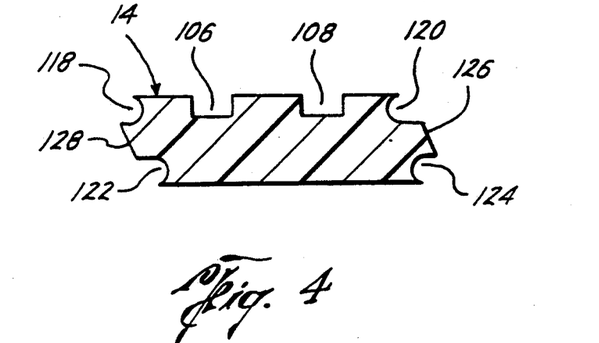
FIG. 4 is a sectional view of the latitudinal ring of FIG. 3, taken along line B—B of FIG. 3.

FIG. 4 is a cross-sectional view of the latitudinal ring 14 along line B—B of FIG. 3. As shown in cross-section, the latitudinal ring 14 includes outer frame member receiving groove 118 and inner frame member receiving groove 120. The receiving grooves 118 and 120 receive inner and outer equatorial section members. Also shown are frame member receiving grooves 122 and 124 which receive frame members of an outer polar section member and an inner polar section member, respectively The door track grooves 106 and 108 are also shown.

The latitudinal ring 14 has outer and inner surfaces 128 and 126 which are curved to align with the overall shape of the inner and outer enclosures As can be appreciated, the placement of the latitudinal ring with respect to the overall shape of the enclosure, will determine the shape necessary to be applied to the surfaces 128 and 126. Ideally, the shape of surfaces 126 and 128 are such that limited interference is given to the smooth-rolling movement of the enclosure The surfaces 128 and 126 should each be maintained at constant radial dimensions from the center of the cage. These radial dimensions should be equal to the radial dimensions of the outer surface of the outer section members and to the inner surface of the inner section members.

Figure 5:
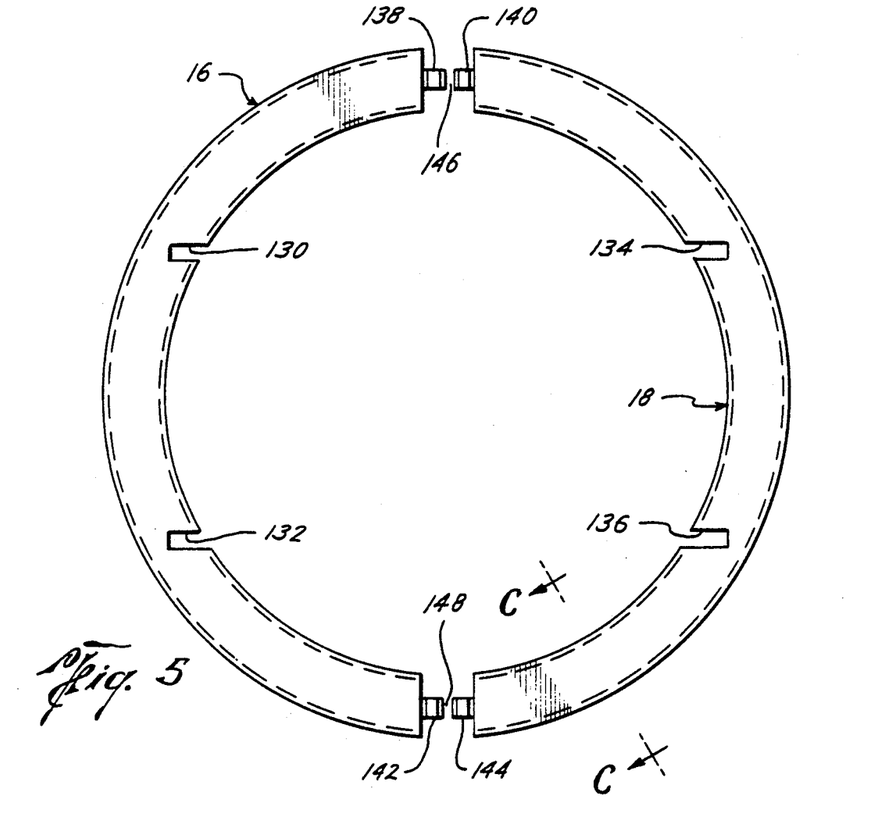
FIG. 5 is a side view of two longitudinal half-rings of an animal cage of the present invention.

FIG. 5 is a side view of the two longitudinal half-rings 16 and 18 shown with respect to the animal cage 10 of FIG. 1. As shown, the longitudinal half-ring 16 includes interlock gaps 130 and 132. The interlock gaps 130 and 132 receive the latitudinal rings to join in forming the support frame. As can be appreciated, the longitudinal half-rings and latitudinal rings may join in a variety of ways to form the support frame The longitudinal half-ring 16 further includes polar joining sections 138 and 142. The longitudinal half-ring 18 is of similar construction to the longitudinal half-ring 16, having interlock gaps 134 and 136 and polar joining sections 140 and 144.

The polar joining sections 138 and 140 join to form a hole 146. Similarly, the polar joining sections 142 and 144 join to form a hole 148. The longitudinal half-rings may be joined in a variety of ways. However, by the structure as shown in FIG. 5, the longitudinal half-rings may be joined with the use of a fastener or a polar cap assembly, so that the animal cage may be simply and easily disassembled and assembled. Disassembly of the animal cage allows for improved cleaning and for ease of transportation. By providing fasteners at the polar sections of the cage only, a minimal number of joining points are required.

Figures 6, 7:
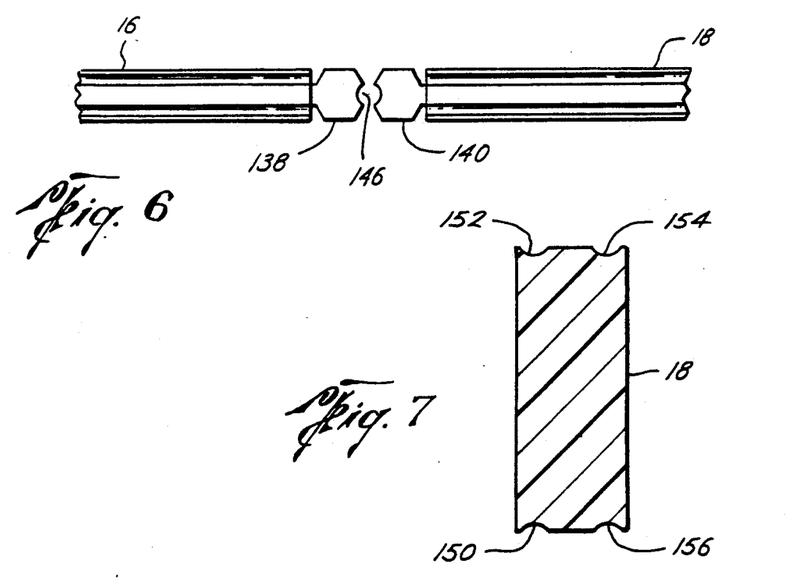
FIG. 6 is a top view of the longitudinal half-rings of FIG. 5.
FIG. 7 is sectional view of a longitudinal half-ring shown in FIG. 5, taken along line C—C of FIG. 5.

FIG. 6 is a top view of the polar meeting of the longitudinal half-rings 16 and 18 shown in FIG. 5. As shown, the polar joining sections 138 and 140 join to form hole 146 through which a fastener or polar cap assembly may be employed.

FIG. 7 is a sectional view of the longitudinal half-ring 18 taken along line C—C of FIG. 5 As shown, the longitudinal half-ring 18 includes frame member receiving grooves 150, 152, 154, and 156. The frame member receiving grooves 150, 152, 154, and 156 receive the frame members of the section members which form the enclosures as heretofore described.

The number and positioning of longitudinal rings and latitudinal rings are dictated by the overall strength requirement and weight requirement of the animal cage. In some instances, only a single latitudinal ring and a single longitudinal ring may be required If only two such rings are employed, the rings will perform best as equatorial rings. The inner and outer enclosures may advantageously be formed of individual section members, each covering a portion of the support frame bounded by the intersections of the longitudinal and latitudinal rings or half-rings.

Preferably, two or more longitudinal half-rings are employed to form the support frame, along with one or more latitudinal rings. The latitudinal rings and the longitudinal rings or half-rings may be formed of a variety of materials including wood, metal, and plastic. Preferably, the rings and half-rings are formed of high-density polyethylene. High-density polyethylene provides the necessary strength and is able to withstand the cleaning and housing conditions likely to be encountered by the cage.

In its preferred form, the animal cage 10 as shown in FIG. 1 includes two latitudinal rings and three longitudinal half-rings. Owing to this construction, the inner and outer enclosures are each formed of six polar section members and three equatorial section members.

Figure 8:
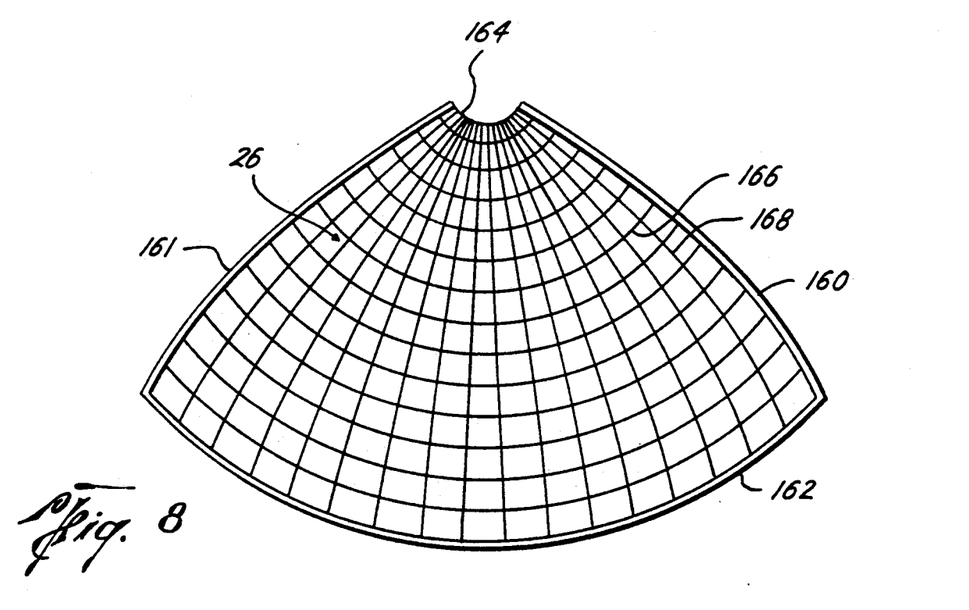
FIG. 8 is a polar section member of an animal cage in accordance with the present invention.

FIG. 8 illustrates the polar section member 26 of the animal cage 10 of FIG. 1. As shown, the polar section member includes frame members 160, 161, and 162 and mesh wires 166 and 168. The polar section member 26 in three dimensional form is curved to form a polar section of the enclosure. The frame member 160 will be received into the frame member receiving groove of longitudinal half-ring 18. Similarly, frame member 161 will be received into the frame member receiving groove of the longitudinal half-ring 16. Frame member 162 will be received into the frame member receiving groove of the equatorial ring 12. By use of the receiving grooves, a firm fit and smooth enclosure surface is maintained. The polar section member 26 terminates in a polar joining shape 164 which will contact the polar section assembly to be more fully described below.

As shown, the polar section member 26 comprises a mesh frame having a multitude of mesh wires such as the mesh wires 166 and 168. As can be appreciated, the section member may be completed with a variety of structures having openings therein. The preferable construction is of wire mesh, since wire mesh offers the necessary strength and is able to withstand caging conditions. Stainless steel wire mesh has been found to be particularly effective for this purpose.

Figure 9:
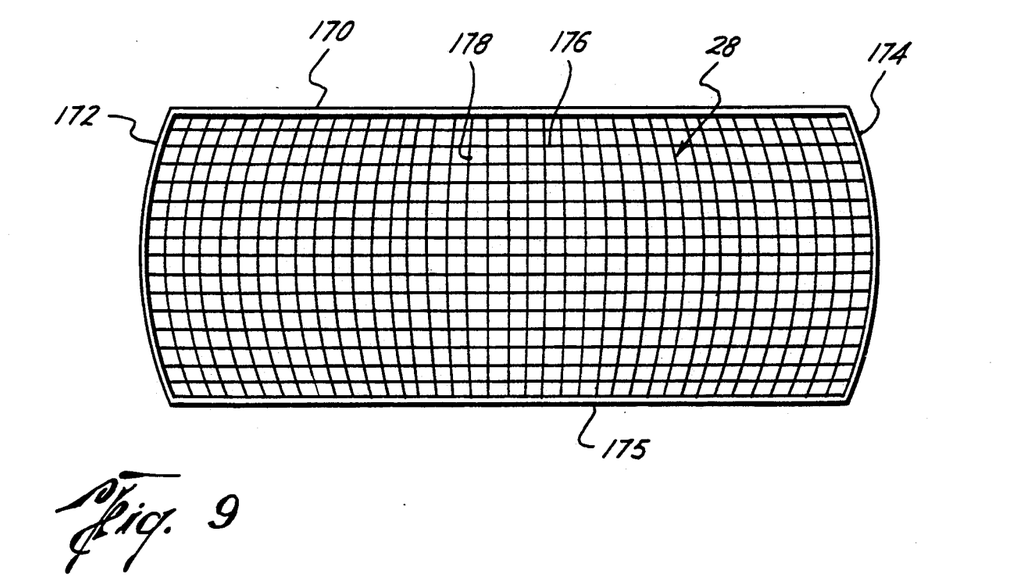
FIG. 9 is an equatorial section member of an animal cage in accordance with the present invention.

FIG. 9 illustrates the equatorial section member 28 of the animal cage 10 of FIG. 1. As shown, the equatorial section member 28 includes frame members 170, 172, 174, and 175. The equatorial section member 28 is curved to form an equatorial section of the enclosure The equatorial section member 28 is formed of wire mesh composed of mesh wires illustrated by mesh wires 176 and 178. As previously discussed, a variety of structures may be provided on the equatorial section member to provide openings for the passage of gases and matter through the enclosure.

Figure 10A:
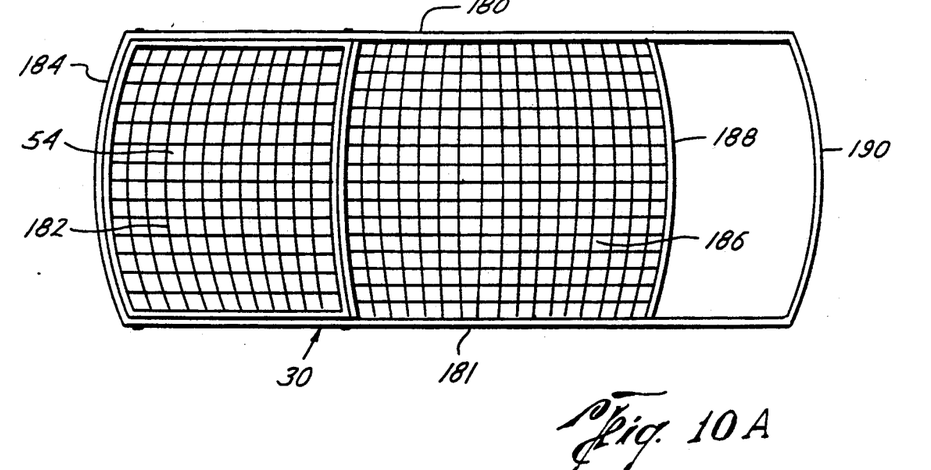
FIG. 10A is an elevational view of an equatorial section member having a door therein.
Figure 10B:
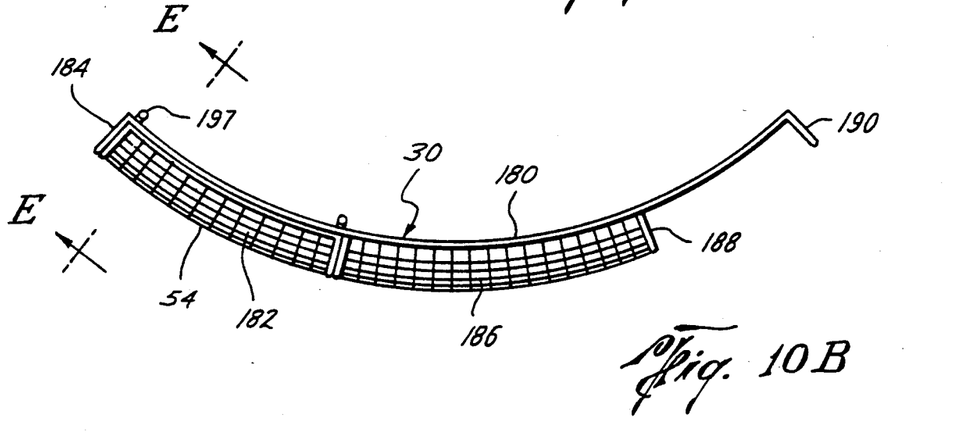
FIG. 10B is a top view of the equatorial section member shown in FIG. 10A.
Figure 10C:
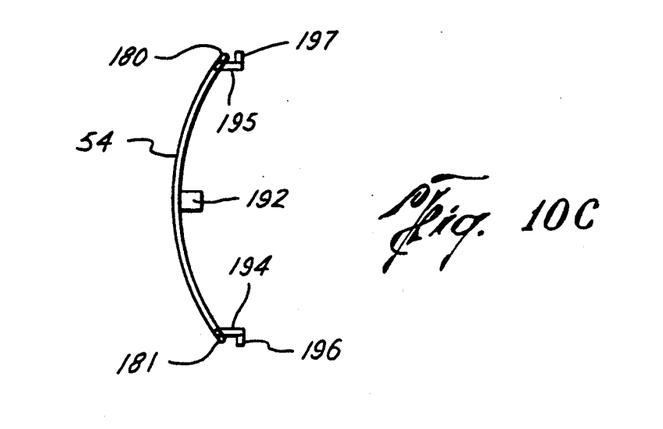
FIG. 10C is a sectional view taken along line E—E of FIG. 10B of the equatorial section member shown in FIG. 10A.

FIGS. 10A-10C illustrate the equatorial section member 30 of the animal cage 10 of FIG. 1 As shown in FIG. 10A, the equatorial section member 30 includes frame members 180, 181, 184, and 190. Formed within the equatorial section member 30 is door 54 having a mesh surface indicated by reference numeral 182. The equatorial section member 30 additionally has a mesh surface generally indicated by reference numeral 186.

The door 54 may be made in a variety of ways. For example, the door may be a simple hinged or latched door of known construction Preferably, the door 54 is slidably operated such that the possibility of accidental opening or jamming of the door or door components is minimized. The equatorial section member 30 may additionally include fluid and food reservoirs, not shown. For ease of manufacture and operation, the location of the door 54 and the fluid and food reservoirs in a single section is advantageous. As shown in FIG. 10A, the fluid and food reservoirs may be located in the space defined by frame member 188 and frame member 190.

A door in the enclosure may be located in virtually any location on the enclosure. For ease of operation, the door is preferably located in an equatorial section member. Where an inner and outer enclosure are employed, an inner and outer door are required, which doors should be in alignment to allow for easy placement of the animal within the second enclosure. The inner and outer doors may be configured to operate together such that a single operation will both open the inner and outer doors.

FIG. 10B is a top view of the equatorial section member 30 shown in FIG. 10A. FIG. 10C is a sectional view taken along line E—E of the door 54 of the equatorial section member 30 shown in FIG. 10B. As shown in FIG. 10C, the door 54 includes door latch keeper 192, door tabs 194 and 195, and door roller assemblies 196 and 197. The door roller assemblies 196 and 197 assist in sliding movement of the door 54, and the door tabs 194 and 195 provide location of the door 54 in the door track grooves previously discussed in connection with FIG. 3. The door latch keeper 192 operates in conjunction with the latch mechanism of the door, to be more fully described below.

Figure 11A:
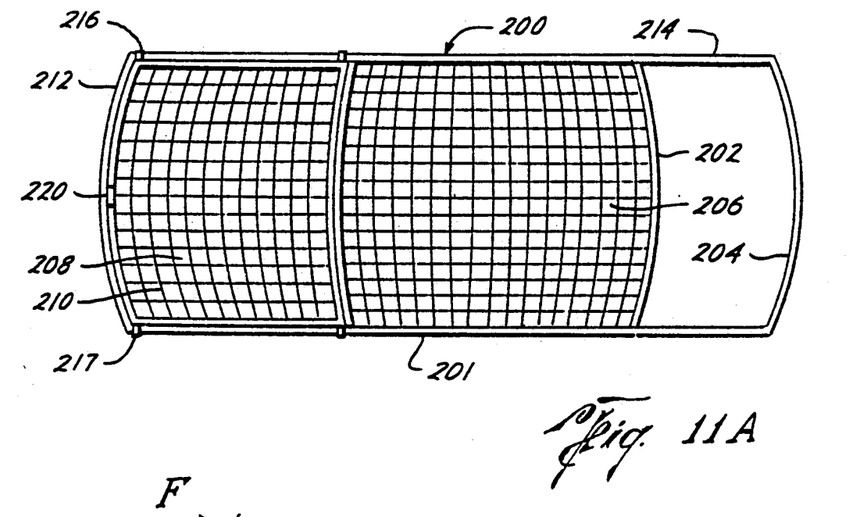
FIG. 11A is an elevational view of an inner equatorial section member of an animal cage of the present invention having a door therein.
Figure 11B:
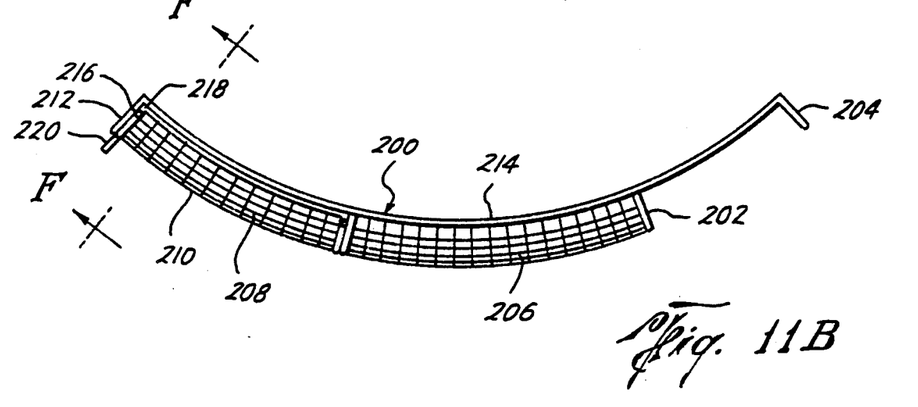
FIG. 11B is a top view of the equatorial section member shown in FIG. 11A.
Figure 11C:
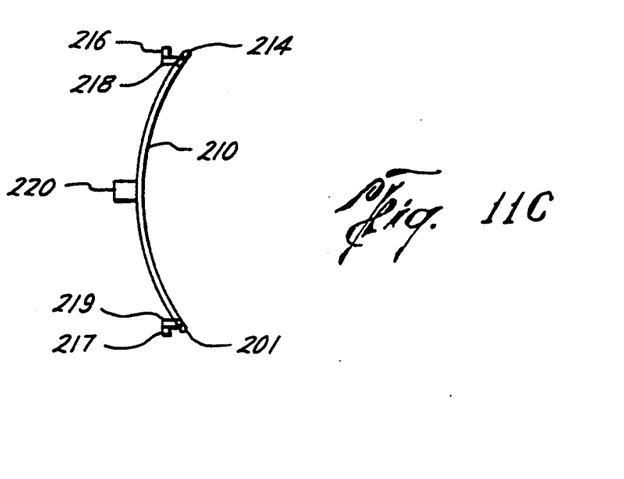
FIG. 11C is a sectional view taken along line F—F of FIG. 11B of the equatorial section member shown in FIG. 11A.

FIGS. 11A-11C illustrate an inner equatorial section member 200 having a door 210 similar to that of the equatorial section member 30 previously described The inner equatorial section member 200 includes frame members 201, 204, 212, and 214. The door 210 has a mesh covering 208 and the equatorial section member 200 has mesh covering 206. An open section bounded by the frame members 202 and 204 is provided for placement of fluid and food reservoirs.

FIG. 11B is a top view of the inner equatorial section member 200 shown in FIG. 11A. FIG. 11C is a sectional view taken along line F—F of the door 210 shown in FIG. 11D. As shown, the door 210 includes door tabs 218 and 219 and door roller assemblies 216 and 217. As discussed above, the door tabs 218 and 219 guide the door in the door track grooves, and the roller assemblies 216 and 217 assist in motion of the door. A door latch keeper 220 is also provided which operates in conjunction with the latch mechanism to be more fully described below Turning now briefly to FIG. 21, there is shown a sectional view taken along line M-M of FIG. 1 showing a portion of the inner door 468 and a portion of the outer door 470, and the relative operation of the inner and outer doors. The inner door 468 moves along track 460. Track 460 includes offsets 464, 466, and 488. The inner door moves along door track 460 by door tabs 478 and 484, and door roller assemblies 476 and 485. As the door is opened, door track 460 causes the door to move inwardly of the enclosure Door track offsets 464, 466, and 488 assist in this movement and help slide the door inwardly. In similar fashion, the outer door is moved along track 462. The track 462 includes offsets 465, 467, and 486. The outer door moves along the track 462 by door tabs 474 and 482, and door roller assemblies 480 and 474. The outer door moves inwardly of the outer enclosure, such that the inner and outer doors move toward each other and within the space between the inner and outer enclosures.

Figure 12A:
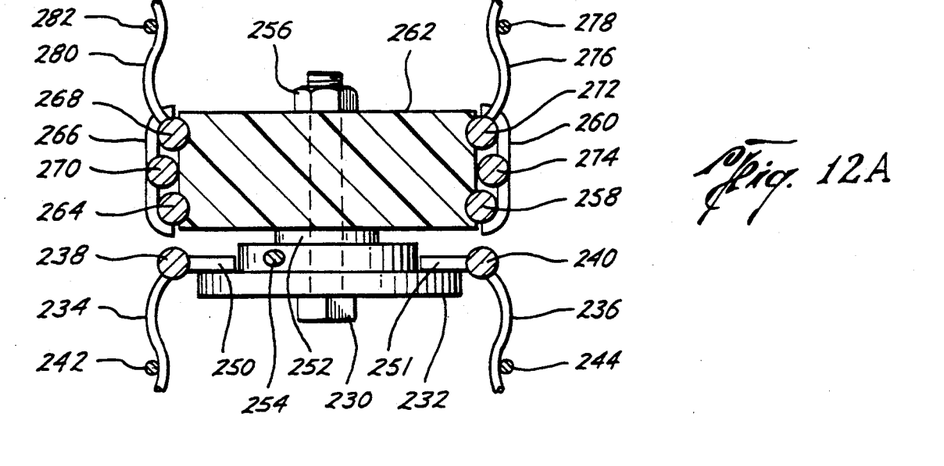
FIG. 12A is a sectional view of the door cam latch assembly taken along line G—G of the animal cage shown in FIG. 1.

FIG. 12A is a sectional view taken along line G—G of FIG. 1 showing the door cam latch assembly The door cam latch assembly includes cam bolt 230 which passes through door latch cam 232 and a portion of the longitudinal ring 262. The cam bolt 230 is maintained against the longitudinal ring by nut 256. The door latch cam 232 is spaced from the longitudinal ring by cam spacer 252. The cam spacer 252 provides for smooth operation of the door latch cam 232 and spaces the door latch cam 232 into relative position between a portion of the door latch keepers designated by references numerals 250 and 251.

As shown, the portions of the door latch keepers 250 and 251 are located between portions of the outer door frame 238 and the inner door frame 240. Mesh wires 234 and 242 are located on the outer door and mesh wires 236 and 244 are located on the inner door. Similarly, FIG. 12A shows in section portions of the inner equatorial door frame 258 and the adjacent inner equatorial section frame member 272. Mesh wires 276 and 278 form a portion of the inner euqatorial section member. Further, a portion 274 of the inner compression bar is shown having retaining bar 260 for maintaining the position of the inner equatorial section member and the inner equatorial door frame. Similarly, portions of the outer equatorial frame member 264 and the adjacent outer equatorial frame member 268 are shown having mesh wires 280 and 282 are shown. A portion of cuter tension bar 270 is shown having retaining bar 266, for tensioning the outer section member against the longitudinal ring. The door latch cam 232 further includes hole 254 for receiving the cam lock pin, to be more fully described below.

Figure 12B:
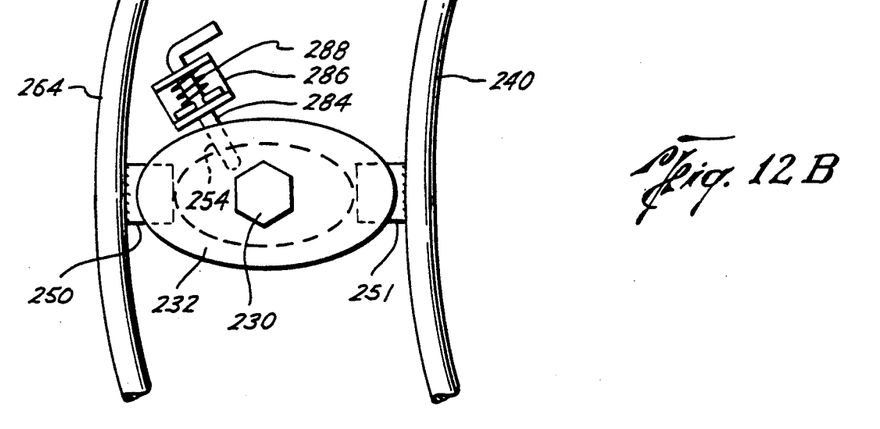
FIG. 12B is a front view in partial section of the door cam latch assembly shown in FIG. 12A.

FIG. 12B is a front view in partial section of the door cam latch assembly shown in FIG. 12A. As shown, the door latch cam 232 is oval in cross-section, and thus may be turned on its axis into or out of contact with the portions of the door latch keepers 250 and 251. A cam lock pin 284 is provided which is received into the hole 254 for maintaining the door latch cam in a locked position. The cam lock pin 284 includes a housing 286 and a biasing spring 288 for urging the cam lock pin into the hole 254. As can now be appreciated, to open the door, the cam lock pin 284 is withdrawn against the tension of the biasing spring 288 from the hole 254. The door latch cam 232 is rotated out of contact with portions of the door latch keepers 250 and 251 to release the inner and outer doors for operation.

Although the door cam latch assembly as described is an effective assembly for operation of the inner and outer doors, a wide variety of door latch mechanisms may be employed of conventional design as will be appreciated by one of skill in the art. Ideally, the door cam latch assembly should provide the necessary security and prevention of accidental opening by the animal as well as not presenting surfaces which could cause injury to the animal during rolling movement of the enclosure.

Figure 13:
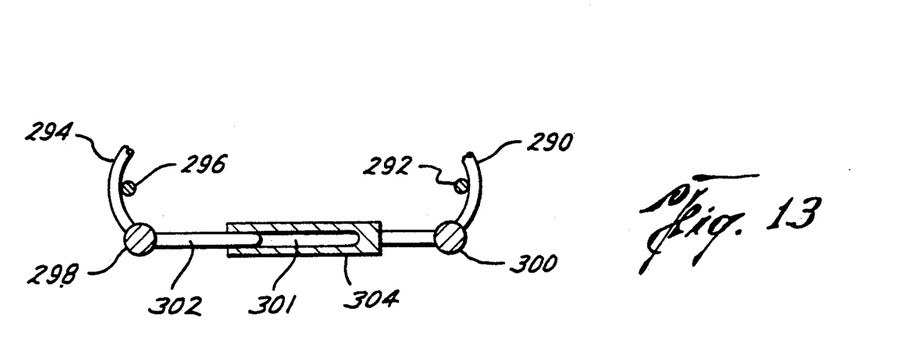
FIG. 13 is a sectional view of the door assembly taken along line H—H of the animal cage shown in FIG. 1.

FIG. 13 is a sectional view taken along line H—H of the animal cage 10 of FIG. 1. FIG. 13 illustrates a portion of the inner door frame 300 having mesh wires 290 and 292, and also a portion of the outer door frame 298 having mesh wires 294 and 296. Extending in an outward direction from the inner door frame is inner door female interlock tab 304. Extending inwardly from the outer door frame is outer door male interlock tab 302. The junction of the female interlock tab 304 and the male interlock tab 302 allow simultaneous operation of the inner and outer doors.

A wide variety of other mechanisms may be employed to join the inner and outer doors for simultaneous operation. The specific configuration shown is particularly effective since operation of the inner and outer doors on the door track grooves causes the outer door to be moved slightly inwardly and the inner door to be moved slightly outwardly such that the distance between the inner and outer doors is narrowed. By allowing a gap 301 between the female interlock tab 304 and the male interlock tab 302, a change in position may be absorbed by sliding movement of the interlock tabs.

Figure 14:
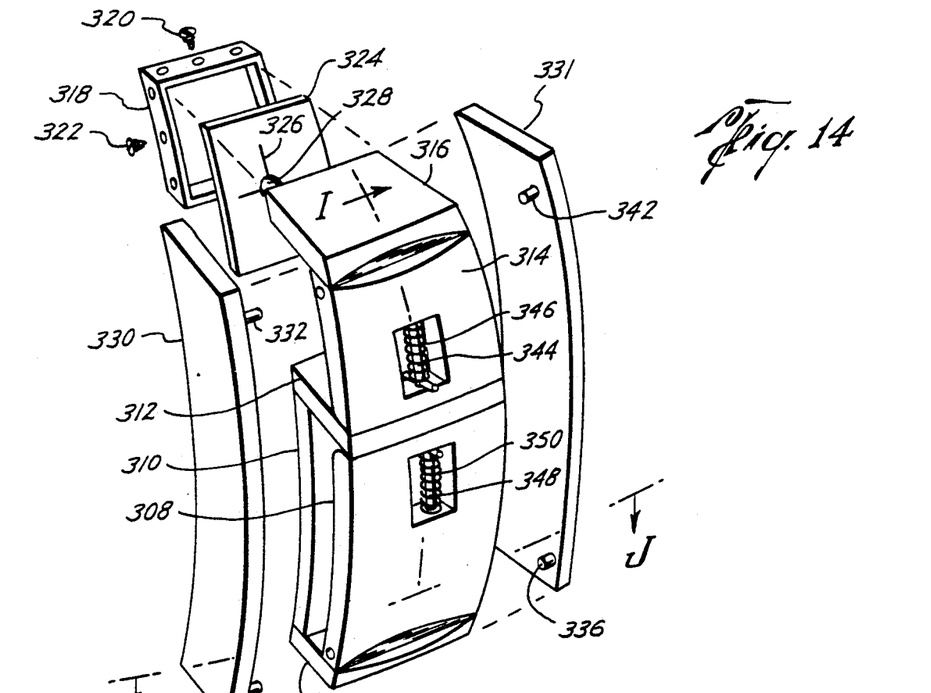
FIG. 14 is an exploded view of a fluid reservoir and a food reservoir of an animal cage of the present invention.

FIG. 14 is an exploded view of a fluid reservoir and food reservoir for use with an animal cage of the present invention. As shown, the fluid reservoir includes fluid reservoir door 308, reservoir inner plate 310, reservoir bottom plate 352, and divider plate 312. The fluid reservoir enclosure is completed by side plates 330 and 331. As will be more fully described, fluid is placed within the fluid reservoir enclosure preferably in the form of a collapsible bladder. The fluid reservoir door 301 includes latch pin 350 and latch pin spring 348. The latch pin 348 and the latch pin spring 350 operate to maintain closure of the fluid reservoir door 308. The fluid reservoir door 308 swings on hinge pins 334 and 336 and may be opened externally of the enclosure for access to the fluid reservoir.

The food reservoir is formed of food reservoir door 314, top plate 316, the divider plate 312, and the side plates 330 and 331. The food reservoir door 314 swings on hinge pins 332 and 342 and includes latch pin 344 and latch pin spring 346. The food reservoir door 314 operates similarly to the fluid reservoir door 308.

Food is placed within the food reservoir by opening the food reservoir door 314. The food is accessible to an animal within the enclosure by an opening provided in the interior side of the food reservoir. Preferably, the opening is expandable such that in a free state spillage of food from the opening is prevented, but the animal can access the food by expansion of the opening.

As shown in FIG. 14, the expandable opening is provided by pressure pad 324. The pressure pad 324 has a hole 328 with radial slots 326 extending therefrom. The pressure pad 324 is made of a resilient material such as rubber, such that pressure on the radial slots 326 around the hole 328 allows the animal to reach inside the food reservoir and obtain food. A pressure pad reinforcement frame 318 is provided to strengthen the outer edges of the pressure pad 324. The pressure pad reinforcement frame 318 may be attached by fasteners 320 and 322.

As further shown in FIG. 14, the overall construction of the food reservoir and fluid reservoir may be combined to provide a compact unit which may be placed in a section member such as an equatorial section member.

Figure 15:
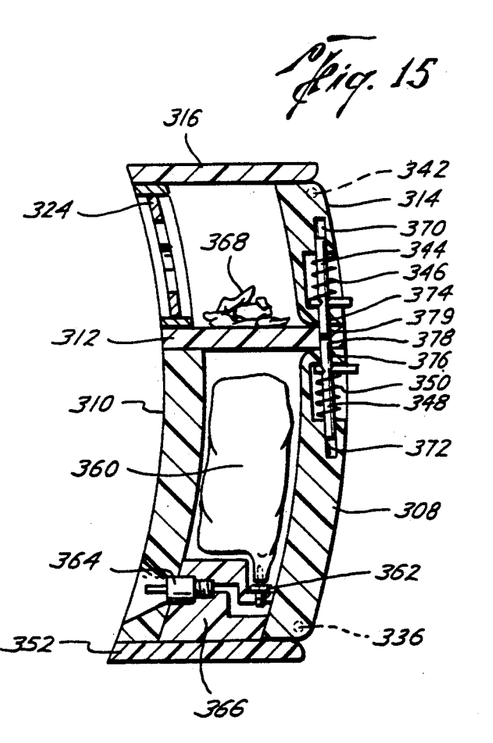
FIG. 15 is a sectional view of the fluid reservoir and food reservoir taken along line I—I of FIG. 14.

FIG. 15 is a sectional view of the food and fluid reservoirs taken along line I—I of FIG. 14. As shown, the fluid reservoir includes a bladder 360 having an attachment fitting 362 and a valve 364 for release of fluid to the animal Bladders and fluid valves of this type are generally known To assist flow of fluid from the bladder, a fluid distribution block 366 is provided within the fluid reservoir Also illustrated in FIG. 15 is the operation of the latch pin 348 and latch pin spring 350. As shown, the latch pin spring 350 biases the latch pin 348 through hole 376 into the lower recess 378 in divider plate 312. To open the door 308, the latch pin 348 is pushed against the latch pin spring 350 to remove it from the lower recess 378 into the recess 372 and allow the door 308 to swing on the hinge pins 336 and 334 (not shown). Similarly, operation of the food reservoir door 314 is accomplished by movement of the latch pin 344 against the latch pin spring 346 to remove the latch pin through hole 374 from the upper recess 379 into the recess 370 to allow the door 314 to swing on the hinge pins 342 and 332 (not shown) Food 368 is placed within the food reservoir. The size of the opening in the pressure pad 324 along with the corresponding radial slots, are sized to prevent spillage and to allow removal of food by the animal.

Figure 16:
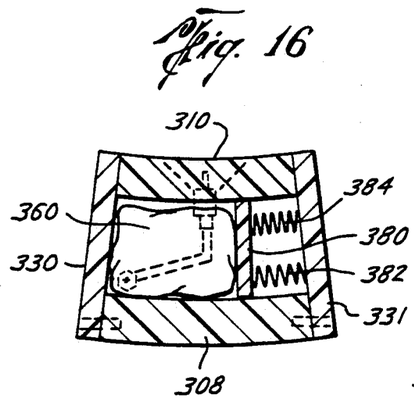
FIG. 16 is a sectional view of the fluid reservoir shown in FIG. 14 taken along line J—J of FIG. 14.

FIG. 16 is a sectional view taken along line J—J of FIG. 14. Since the enclosure will be rotated with the varying changes in orientation of the fluid reservoir and bladder, operation of the fluid reservoir is enhanced by providing bladder pressure means to maintain in the bladder a pressure greater than atmospheric. A variety of methods may be employed for this purpose. In the method shown in FIG. 16, a spring activated wall 380 is urged into contact with the bladder by springs 382 and 384. As can be appreciated, the spring-activated wall 380 increases the pressure in the bladder 360 to allow better flow of fluid from the bladder.

Figures 17A, 17B:
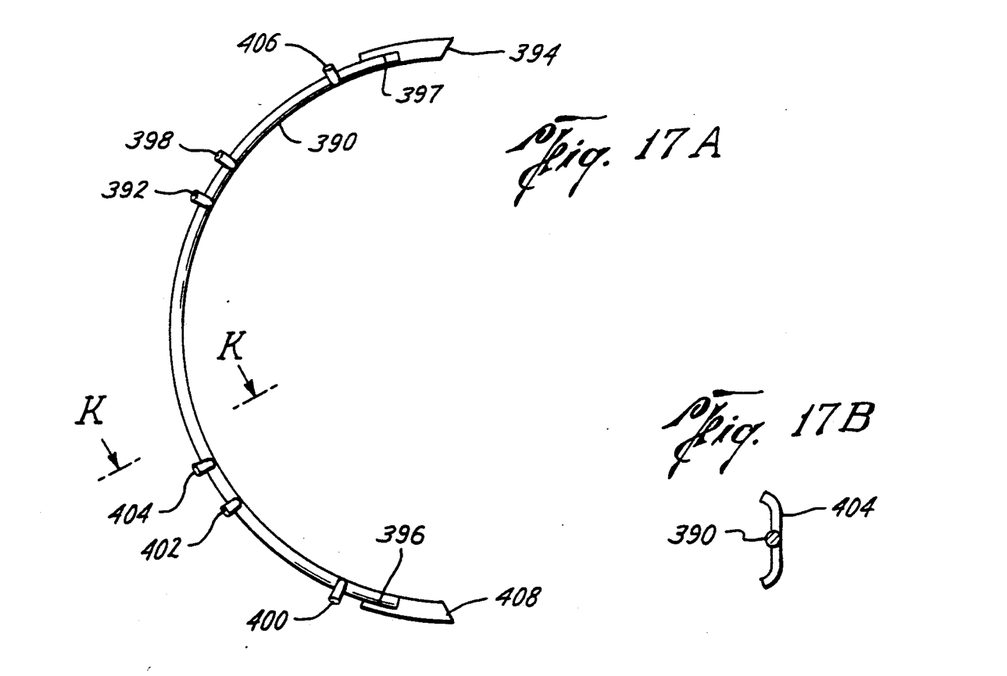
FIG. 17A is a side view of an inner compression bar assembly of an animal cage in accordance with the present invention.
FIG. 17B is a sectional view of the inner compression bar shown in FIG. 17A.

FIGS. 17A and 17B illustrate an inner compression bar 390 for use in compressing the section members of the inner enclosure against the inner side of the support frame The inner compression bar 390 includes retaining bars 392, 398, 400, 402, 404, and 406. As discussed above, the retaining bars operate to maintain the position of the section members As shown, the retaining bars 400 and 402 are positioned to engage a lower polar section member, the retaining bars 404 and 392 are positioned to engage an equatorial section member, and the retain bars 398 and 406 are positioned to engage an upper polar section members Retaining bars of varying members may be employed in various positions to provide secure positioning of the section members The inner compression bar 390 further includes inner inclined compression plates 394 and 408. The inner inclined compression plates 394 and 408 are attached to the inner compression bar 390 at points 396 and 397. Attachment may be made by welding, glue, fasteners, or the like.

FIG. 17B is a sectional view taken along line K—K of FIG. 17A. FIG. 17B shows the inner compression bar 390 having retaining bar 392 thereon As shown, the retaining bar 392 is outwardly curved to engage the section members to maintain them in relative position.

Figures 18A, 18B:
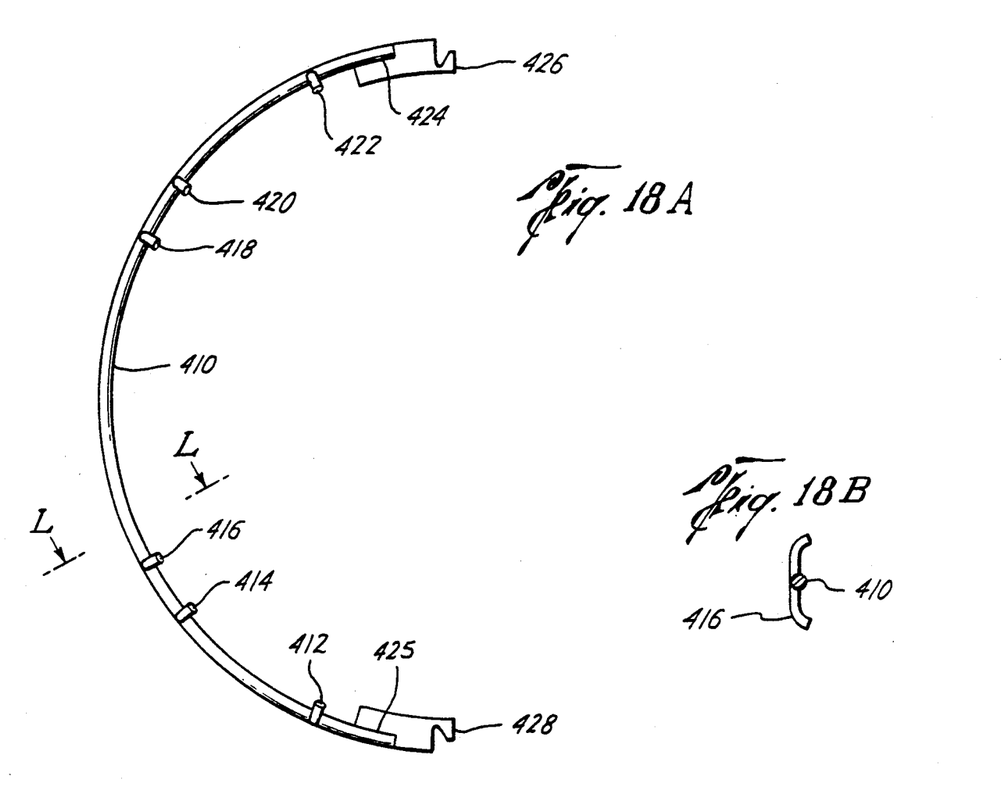
FIG. 18A is a top view of an outer tension bar of an animal cage in accordance with the present invention.
FIG. 18B is a sectional view of the outer tension bar shown in FIG. 18A.

FIG. 18A illustrates an outer tension bar 410 for use in tensioning the section members against the outer side of the support frame The outer tension bar 410 includes retaining bars 412, 414, 416, 418, 420, and 422. As shown, the retaining bars 412 and 414 are positioned to engage a lower polar section member. Similarly, the retaining bars 416 and 418 are positioned to engage an equatorial section member. The retaining bars 420 and 422 are positioned to engage an upper polar section member. As stated above, retaining bars of varying numbers may be employed in various positions to provide secure positioning of the section members Preferably, a retaining bar is aligned with each longitudinal half-ring. The outer tension bar 410 further includes outer inclined tension plates 426 and 428. The outer incline tension plates 426 and 428 are attached at points 424 and 425 to the outer tension bar 410.

FIG. 18B is a sectional view taken along L—L of FIG. 18A of outer tension bar 410. Shown is outer tension bar 410 and retaining bar 416. As shown, retaining bar 412 is curved inwardly to engage the section members.

Figure 19:
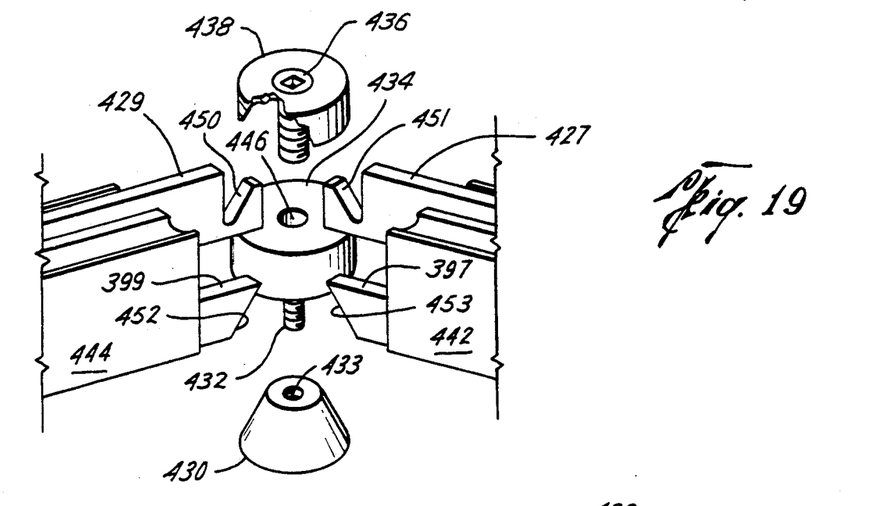
FIG. 19 is a perspective view of the polar cap assembly of an animal cage in accordance with the present invention.

FIG. 19 illustrates a polar cap assembly which may be used in conjunction with an animal cage of the present invention The polar cap assembly includes inner compression cone 430, inner cone fastener 432, polar cap retaining cup 434, and outer tension conical cap 438. The outer tension conical cap 438 has a hole in its center for receiving the outer cap fastener 436. The outer cap fastener 436 threads into hole 446 in the polar cap retaining cup 434. Also positioned within the hole 446 is the inner cone fastener 432 which threads into hole 433 of the inner compression cone 430. The inner cone fastener 432 i accessible through the outer cap fastener 436 by virtue of hole 440 which passes through the outer cap fastener 436.

The outer tension conical cap 438 engages the outer inclined tension plates 427 and 429 which, as discussed above, are attached to outer tension bars. The inner inclined compression plates 397 and 399 contact the slanted surface of the inner compression cone 430 and are connected to inner compression bars as discussed above. The outer inclined tension plates 427 and 429 and the inner inclined compression plates 397 and 399 are contained in grooves in longitudinal half-rings 442 and 444.

The operation of the polar cap assembly is to provide tension to the outer tension bars and compression to the inner compression bars to maintain the section members in place along the latitudinal and longitudinal rings or half-rings. As the outer cap fastener 436 is tightened into hole 446, the outer tension conical cap 438 pulls against the inclined surfaces 450 and 451 to pull the outer inclined tension plates toward the hole 446, and thus applies tension to the outer tension bars. Tightening of the inner cone fastener 432 into the hole 433 causes the slanted edge of inner compression cone 430 to contact inclined surfaces 452 and 453 of the inner compression bars to force the inclined surfaces away from the hole 433, thereby providing compression to the inner compression bars and maintaining the inner section members in location.

Figures 20, 21:
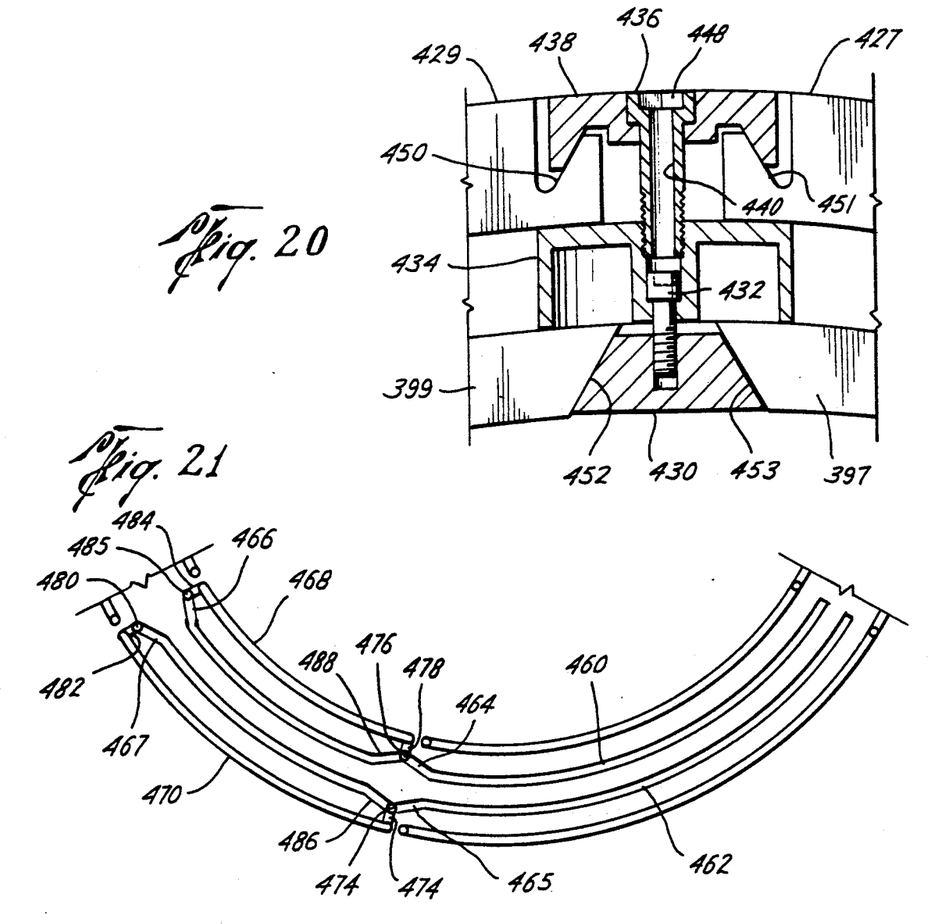
FIG. 20 is a sectional view of the polar cap assembly shown in FIG. 19.
FIG. 21 is a sectional view of the animal cage of FIG. 1, taken along line M—M of FIG. 1.

FIG. 20 is a sectional view of the polar cap assembly of FIG. 19. The fastener 436 may include a hexagonal or keyed opening 448 by which tightening of the fastener 436 may be accomplished, and by which a hole through the fastener 436 may be permitted to allow access to the fastener 432 Polar joining of the support frame may be accomplished in numerous ways. However, the polar cap assembly of the type described is particularly useful to minimize the amount of time and effort required to disassemble and assemble the animal cage. For practical utility of the animal cage, it is desirable that the cage be capable of assembly and disassembly in an acceptable period of time The cage may need to be disassembled for purposes of washing, storage, or transportation. The polar cap assembly thus described allows disassembly of the animal cage through the loosening of only four fasteners, corresponding to fasteners 432 and 436 in each of two polar cap assemblies.

What is claimed is:

1. An animal cage, comprising:
    an enclosure of shape capable of rolling movement, the enclosure having openings therein for passage of gases and matter therethrough and for preventing egress of the animal;
    a door in the enclosure for passage of the animal; and
    a fluid reservoir located on the enclosure for dispensing fluid to the animal, the fluid reservoir comprising a collapsible bladder having a valve for selectively releasing fluid therefrom.

2. The animal cage of claim 1, further comprising bladder pressure means for exerting pressure against the bladder to maintain a pressure in the bladder of greater than atmospheric.

3. The animal cage of claim 2 wherein the bladder pressure means is a spring-activated wall located on the enclosure.

4. An animal cage, comprising:
    a first enclosure of shape capable of rolling movement, the enclosure having openings therein for passage of gases and matter therethrough;
    a second enclosure disposed within the first enclosure, the second enclosure having openings therein for passage of gases and matter therethrough and for preventing egress of the animal; and
    a fluid reservoir disposed between the first and second enclosures for dispensing fluid to the animal, the fluid reservoir comprising a collapsible bladder having a valve for selectively releasing fluid therefrom.

5. The animal cage of claim 4, further comprising bladder pressure means for exerting pressure against the bladder to maintain a pressure in the bladder of greater than atmospheric.

6. The animal cage of claim 5 wherein the bladder pressure means is a spring-activated wall located on the enclosure.

7. An animal cage, comprising:
    a support frame of shape capable of rolling movement;
    a first enclosure located on the outer side of the support frame, the outer enclosure having openings therein for passage of gasses and matter therethrough;
    a second enclosure located in the inner side of the support frame, the inner enclosure having openings therein for passage of gases and matter therethrough and for preventing egress of the animal; and
    a fluid reservoir disposed between the first and second enclosures for dispensing fluid to the animal, the fluid reservoir comprising a collapsible bladder having a valve for selectively releasing fluid therefrom.

8. The animal cage of claim 7, further comprising bladder pressure means for exerting pressure against the bladder to maintain a pressure in the bladder of greater than atmospheric.

9. The animal cage of claim 8 wherein the bladder pressure means is a spring-activated wall located on the enclosure.

10. An animal cage, comprising:
    a spherical support frame of shape capable of rolling movement, the support frame comprising one or more evenly-spaced latitudinal rings and two or more evenly-spaced longitudinal half-rings, the latitudinal rings and longitudinal half-rings interlocking at each intersection and spaced at the polar ends thereof to form the support frame;
    a first spherical enclosure located on the outer side of the support frame, the outer enclosure having openings therein for passage of gases and matter therethrough;
    a second spherical enclosure located in the inner side of the support frame, the inner enclosure having openings therein for passage of gases and matter therethrough and for preventing egress of the animal, the outer enclosure and the inner enclosure composed of individual section members each covering a portion of the support frame bounded by the intersection of a latitudinal ring and two longitudinal half-rings; and
    one or more inner compression bars and one or more outer tension bars such that compression of the inner compression bars compresses the section members of the inner enclosure against the inner side of the support frame and such that tension of the outer tension bars tension the section members of the outer enclosures against the outer side of the support frame.

11. The animal cage of claim 10, further comprising a compression cone and a tension cone located at the polar ends of the support frame and in contact with the inner compression bars and outer tension bars such that outward movement of the compression cone compresses the inner compression bars and inward movement of the tension cone tensions the outer tensions bars.

12. An animal cage, comprising:
    an enclosure of shape capable of rolling movement, the enclosure having openings therein for passage of gases and matter therethrough and for preventing egress of the animal;
    a door in the enclosure for passage of the animal; and
    a food reservoir located on the enclosure for dispensing food to the animal, the food reservoir having an expandable opening the access by the animal to the food.

13. The animal cage of claim 12 further comprising a fluid reservoir located on the enclosure for dispensing fluid to the animal.

14. The animal cage of claim 12 or 13 wherein the expandable opening comprises a pressure pad having a hole with radial slots therethrough, the hole and radial slots preventing spillage of food in a free state and allowing removal of food by expansion of the opening.

15. An animal cage, comprising:
    a first enclosure of shape capable of rolling movement, the enclosure having openings therein for passage of gases and matter therethrough;
    a second enclosure disposed within the first enclosure, the second enclosure having openings therein for passage of gases and matter therethrough and for preventing egress of the animal; and
    a food reservoir disposed between the first and second enclosures for dispensing food to the animal, the food reservoir having an expandable opening for access by the animal to the food.

16. The animal cage of claim 15 further comprising a fluid reservoir disposed between the first and second enclosures for dispensing fluid to the animal.

17. The animal cage of claim 15 or 16 wherein the expandable opening comprises a pressure pad having a hole with radial slots therethrough, the hole and radial slots preventing spillage of food in a free state and allowing removal of food by expansion of the opening.

18. An animal cage, comprising:
a support frame of shape capable of rolling movement;
a first enclosure located on the outer side of the support frame, the outer enclosure having openings therein for passage of gases and matter therethrough;
a second enclosure located in the inner side of the support frame, the inner enclosure having openings therein for passage of gases and matter therethrough and for preventing egress of the animal; and
a food reservoir disposed between the first and second enclosures for dispensing food to the animal, said food reservoir having an expandable opening for access by the animal to the food.

19. The animal cage of claim 18, further comprising a fluid reservoir disposed between the first and second enclosures for dispensing fluid to the animal.

20. The animal cage of claim 18 or 19, wherein the expandable opening comprises a pressure pad having a hole with radial slots therethrough, the hole and radial slots preventing spillage of food in a free state and allowing removal of food by expansion of the opening.

* * * * *